US012775614B2

(12) United States Patent
El-Haddad et al.

(10) Patent No.: US 12,775,614 B2
(45) Date of Patent: Oct. 27, 2026

(54) COMPUTING SYSTEM AND METHOD FOR AUTOMATICALLY GENERATING STRUCTURED QUERIES BASED ON CONSTRUCTION-RELATED NATURAL-LANGUAGE REQUESTS

(71) Applicant: Procore Technologies, Inc., Carpinteria, CA (US)

(72) Inventors: Elijah El-Haddad, Poway, CA (US); Michael David Fairchild, Ventura, CA (US); Jayadev Padmaja Rajan, Mississauga (CA); Ryan Michael Fuentes, Austin, TX (US); Siddhartha Chatterjee, Austin, TX (US)

(73) Assignee: Procore Technologies, Inc., Carpinteria, CA (US)

( * ) Notice: Subject to any disclaimer, the term of this patent is extended or adjusted under 35 U.S.C. 154(b) by 0 days.

(21) Appl. No.: 18/952,879

(22) Filed: Nov. 19, 2024

(65) Prior Publication Data

US 2026/0140944 A1 May 21, 2026

(51) Int. Cl.
*G06F 16/2452* (2019.01)
*G06F 16/248* (2019.01)

(52) U.S. Cl.
CPC ...... *G06F 16/24522* (2019.01); *G06F 16/248* (2019.01)

(58) Field of Classification Search
None
See application file for complete search history.

(56) References Cited

U.S. PATENT DOCUMENTS

| | | | | |
|---|---|---|---|---|
| 12,380,096 | B1 * | 8/2025 | Ziv | G06F 16/243 |
| 2015/0089353 | A1 * | 3/2015 | Folkening | H04L 67/10 715/234 |
| 2019/0272342 | A1 | 9/2019 | Berg et al. | |
| 2024/0281222 | A1 | 8/2024 | Trummer | |

(Continued)

OTHER PUBLICATIONS

Abioye, Sofiat O. et al., "Artificial Intelligence in the Construction Industry: A Review of Present Status, Opportunities and Future Challenges", Journal of Building Engineering, vol. 44, Oct. 5, 2021, 13 pages.

(Continued)

*Primary Examiner* — Dawaune A Conyers

(74) *Attorney, Agent, or Firm* — Lee Sullivan Shea & Smith LLP

(57) ABSTRACT

A computing system is configured to: (i) receive, from a client device, a natural-language query that is related to a construction project managed via a construction management software platform, (ii) generate a prompt for a generative AI model that comprises a request to transform the natural-language query into a structured query of a relational data store that is related to the construction project, (iii) pass the prompt to the generative AI model, (iv) receive, from the generative AI model, a response that comprises the structured query that is generated by the generative AI model, (v) perform a search in accordance with the structured query and thereby return search results comprising a dataset that is returned based on the structured query, (vi) based on the search results, generate a response to the natural-language query, and (vii) present, using the client device, the response to the user.

20 Claims, 7 Drawing Sheets

(56) References Cited

U.S. PATENT DOCUMENTS

| | | | | |
|---|---|---|---|---|
| 2024/0296279 | A1 | 9/2024 | Gardner | |
| 2024/0330421 | A1 | 10/2024 | Ailawadi | |
| 2024/0378206 | A1 | 11/2024 | Po | |
| 2025/0156455 | A1* | 5/2025 | Subbiah | G06F 16/3335 |
| 2025/0245446 | A1* | 7/2025 | Ayed | G06F 8/35 |
| 2025/0278634 | A1* | 9/2025 | Kumar | G06N 3/091 |
| 2025/0298819 | A1* | 9/2025 | Han | G06F 16/353 |
| 2025/0335481 | A1* | 10/2025 | Shon | G06N 3/042 |

OTHER PUBLICATIONS

Jayatillake, David et al., "AI-Powered Conversational Interface for the Semantic Layer", Cube Blog, [online], [retrieved Sep. 16, 2024], Retrieved from the Internet: <https://cube-dev/blog/conversational-interface-for-semantic-layer, 9 pages.

Nitsenko, Mikhail et al., "Introducing the LangChain Integration", Cube Blog, [online], [retrieved Sep. 16, 2024], Retrieved from the Internet:<https://cube-dev/blog/introducing-the-langchain-integration, 11 pages.

International Searching Authority, PCT International Search Report and Written Opinion, PCT International Application No. PCT/US2025/056076, Apr. 7, 2026, 9 pages.

* cited by examiner

COMPUTING SYSTEM AND METHOD FOR AUTOMATICALLY GENERATING STRUCTURED QUERIES BASED ON CONSTRUCTION-RELATED NATURAL-LANGUAGE REQUESTS

BACKGROUND

Increasingly, parties involved in construction projects are beginning to use software applications to manage those construction projects. One example of such a software application is the software-as-a-service (Saas) application for construction management offered by Procore Technologies, Inc. ("Procore"), who is the current applicant. Using construction management software applications such as these, parties can create a digital representation of a given construction project that is to be managed and then create, store, view, and/or interact with various types of digital project data associated with the given construction project. Such digital project data may include specifications, drawings, building information model (BIM) files, requests for information (RFIs), punch lists (e.g., which list work that has not yet been completed or has been completed incorrectly), risk management plans, safety plans, work breakdown structures, change orders, inspection documents (e.g., which record information about the results of inspections), construction submittals (e.g., mock-ups or other documents that contractors create to depict proposed plans), construction site observation reports, project management records (e.g., project schedules and project budgets), third-party records (e.g., applicable zoning restrictions, real-estate title records and purchase records, records of public hearings pertinent to the given construction project), directories, invoices, timesheets, meeting minutes, sensor data, and daily logs (e.g., which record information about each day work is done at a work site of the construction project), among many other examples of project data that may be stored for a construction project.

OVERVIEW

Disclosed herein is new technology that enables a user to input a question in the form of a natural-language request and then transforms the natural-language request into a structured query that can be executed in order to retrieve data from a relational data store for purposes of answering the user's question.

In one aspect, the disclosed technology may take the form of a method that involves (i) receiving, from a client device, a natural-language query (a) that was input by a user and (b) that is related to a construction project managed via a construction management software platform, (ii) generating a prompt for a generative AI model that comprises a request to transform the natural-language query into a structured query of a relational data store that is related to the construction project, (iii) passing the prompt to the generative AI model, (iv) receiving, from the generative AI model, a response that comprises the structured query that is generated by the generative AI model, (v) performing a search in accordance with the structured query and thereby return search results comprising a dataset that is returned based on the structured query, (vi) based on the search results, generating a response to the natural-language query, and (vii) presenting, using the client device, the response to the user.

The disclosed technology may involve various other functionalities. For example, the method may further involve determining whether the natural-language query relates to structured data.

In another example, the method may further involve, (i) based on the search results, generating a report related to the natural-language query and (ii) presenting, using the client device, the report to the user.

The functionality for generating the prompt for the generative AI model may take any of various forms. For example, the functionality for generating the prompt for the generative AI model may involve, if the natural-language query relates to structured data, generating the prompt for the generative AI model that comprises the request to transform the natural-language query into the structured query of the relational data store that is related to the construction project. In another example, the functionality for generating the prompt for the generative AI model may involve, using a first AI agent, generating the prompt for the generative AI model that comprises the request to transform the natural-language query into the structured query of the relational data store that is related to the construction project. In a further example, the method may further involve, (i) if the natural-language query relates to structured data, routing the natural-language query to the first AI agent, and, (ii) if the natural-language query does not relate to structured data, route the natural-language query to a second AI agent.

The functionality for determining whether the natural-language query relates to structured data may take any of various forms. For example, determining whether the natural-language query relates to structured data may involve (i) generating a prompt for an AI model comprising a request to determine whether the natural-language query relates to structured data, (ii) passing the prompt as input to the AI model, and (iii) receiving a response from the AI model comprising a prediction of whether the natural-language query relates to structured data.

The structured query may take any of various forms. For example, the structured query comprises a Structured Query Language ("SQL") query.

The prompt may take any of various forms. For example, the prompt may further include configuration data related to the relational data store. In a further example, the configuration data may include one or both of database-schema data or database metadata In yet another aspect, disclosed herein is a computing platform that includes at least one communication interface, at least one processor, at least one non-transitory computer-readable medium, and program instructions stored on the at least one non-transitory computer-readable medium that, when executed by the at least one processor, cause the computing platform to carry out the functions disclosed herein, including (but not limited to) any of the functions of the foregoing methods.

In yet another aspect, disclosed herein is a non-transitory computer-readable medium provisioned with program instructions that, when executed by at least one processor, cause a computing platform to carry out the functions disclosed herein, including (but not limited to) any of the functions of the foregoing methods.

One of ordinary skill in the art will appreciate these as well as numerous other aspects in reading the following disclosure.

BRIEF DESCRIPTION OF THE DRAWINGS

FIG. 6 depicts example functionality of the disclosed software technology in the form of a flow diagram, according to the present disclosure.

Figure 1:
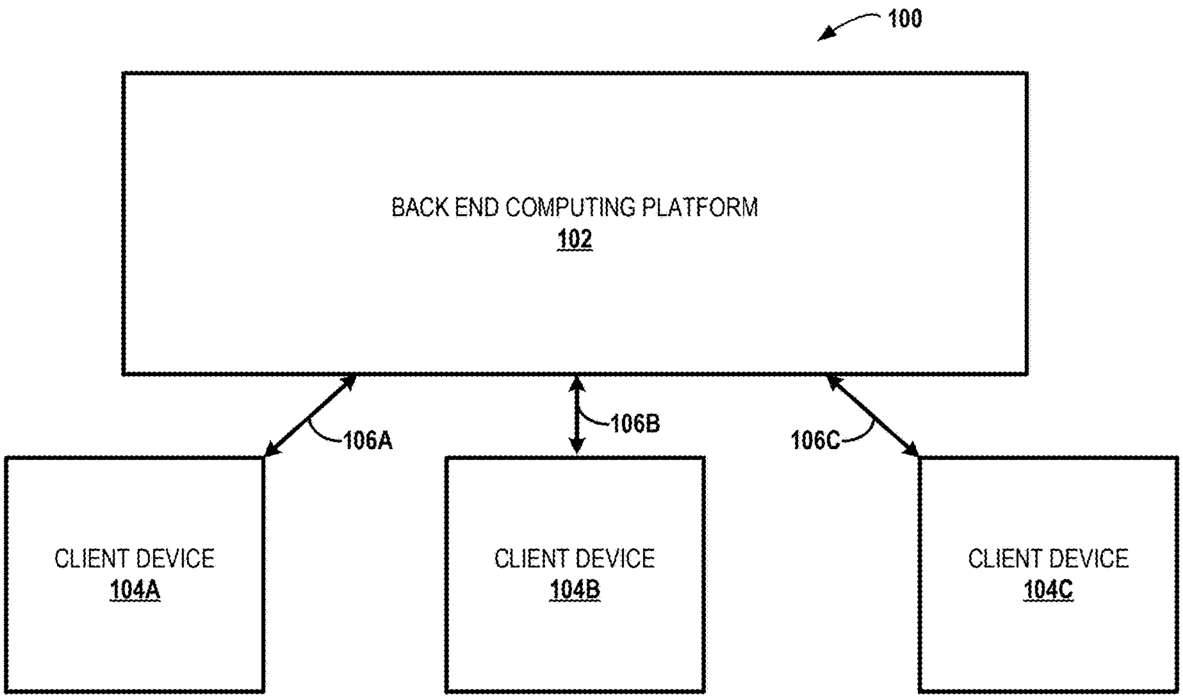
FIG. 1 depicts an example network environment in which a construction management software application may be implemented, according to the present disclosure.

Features, aspects, and advantages of the presently disclosed technology may be better understood with regard to the following description, appended claims, and accompanying drawings, as listed below. The drawings are for the purpose of illustrating example embodiments, but those of ordinary skill in the art will understand that the technology disclosed herein is not limited to the arrangements and/or instrumentality shown in the drawings.

DETAILED DESCRIPTION

The following disclosure refers to the accompanying figures and several examples. A person of ordinary skill in the art will understand that such references are for the purpose of explanation only and are therefore not meant to be limiting. Part or all of the disclosed systems, devices, and methods may be rearranged, combined, added to, and/or removed in a variety of manners, each of which is contemplated herein.

Construction management today is often performed through the use of software applications, such as the software application provided by Procore Technologies, Inc.® ("Procore," which is the applicant of the present disclosure). These software applications generally provide users the ability to create, store, view, and/or interact with various types of data related to a construction project.

In practice, these construction management software applications may take various forms. As one possible implementation, a construction management software application may include both front-end client software running on client devices that are accessible to individuals associated with construction projects (e.g., contractors, project managers, architects, engineers, designers, etc.) and back-end software running on a back-end platform (sometimes referred to as a "cloud" platform) that interacts with and/or drives the front-end software, and which may be operated (either directly or indirectly) by the provider of the front-end client software. This form of a software application may be referred to as a client-server application or a software-as-a-service (SaaS) application, among other possibilities. As another possible implementation, a construction management software application may include front-end client software that runs on client devices without interaction with a back-end platform. These software applications may take other forms as well.

Turning now to the figures, FIG. 1 depicts an example network environment 100 in which a construction management software application may be implemented. As shown in FIG. 1, the network environment 100 includes a back-end computing platform 102 that may be communicatively coupled to one or more client devices 104, which include the client device 104A, the client device 104B, and the client device 104C. Although the client devices 104 are depicted by three devices as shown for the sake of simplicity in illustration, it should be understood that the client devices 104 may represent more or less than three devices without departing from the spirit and scope of this disclosure.

Broadly speaking, the back-end computing platform 102 may comprise one or more computing systems that have been provisioned with back-end software for a construction management software application, which may include program code for carrying out one or more of the platform-side functions disclosed herein. The one or more computing systems of the back-end computing platform 102 may collectively comprise some set of physical computing resources (e.g., one or more processors, data storage systems, communication interfaces, etc.), which may take various forms and be arranged in various manners.

For instance, as one possibility, the back-end computing platform 102 may comprise computing infrastructure of a public, private, and/or hybrid cloud (e.g., computing and/or storage clusters) that has been provisioned with back-end software for the construction management software application. In this respect, the entity that owns and operates the back-end computing platform 102 may supply its own cloud infrastructure or obtain the cloud infrastructure from a third-party provider of "on demand" computing resources, such as Amazon Web Services (AWS) or the like. As another possibility, the back-end computing platform 102 may comprise one or more dedicated servers that have been provisioned with back-end software for the construction management software application.

Further, in practice, the back-end software installed at the back-end computing platform 102 may be implemented using any of various software architecture styles, examples of which may include a microservices architecture, a service-oriented architecture, and/or a serverless architecture, among other possibilities, as well as any of various deployment patterns, examples of which may include a container-based deployment pattern, a virtual-machine-based deployment pattern, and/or a Lambda-function-based deployment pattern, among other possibilities.

Further yet, although not shown in FIG. 1, the back-end software installed at the back-end computing platform 102 may interact with a data storage layer of the back-end computing platform 102, which may comprise data stores of various different forms, examples of which may include relational data stores (e.g., Online Transactional Processing (OLTP) databases), NoSQL databases (e.g., columnar databases, document databases, key-value databases, graph databases, etc.), file-based data stores (e.g., Hadoop Distributed File System), object-based data stores (e.g., Amazon S3), data warehouses (which could be based on one or more of the foregoing types of data stores), data lakes (which could be based on one or more of the foregoing types of data stores), message queues, or streaming event queues, among other possibilities.

The back-end computing platform 102 may comprise various other components and take various other forms as well.

In turn, the client devices 104 may each be any computing device that is capable of running front-end software of the construction management software application, which may include program code for carrying out the client-side functions disclosed herein. In this respect, the client devices 104 may each include hardware components such as one or more processors, computer-readable mediums, communication interfaces, and input/output (I/O) components (or interfaces for connecting thereto), among others, as well as software components that facilitate the client device's ability to run the front-end software (e.g., operating system software, web browser software, etc.). As representative examples, the client devices 104 may each take the form of a desktop computer, a spatial computer, a laptop, a netbook, a tablet, a smartphone, and/or a personal digital assistant (PDA), among other possibilities.

As further depicted in FIG. 1, the back-end computing platform 102 is configured to interact with the client devices 104 over respective communication paths 106. In this respect, each of the communication paths 106 between the back-end computing platform 102 and one of the client devices 104 may generally comprise one or more communication networks and/or communications links, which may take any of various forms. For instance, each of the respective communication paths 106 with the back-end computing platform 102 may include any one or more of point-to-point links, Personal Area Networks (PANs), Local-Area Networks (LANs), Wide-Area Networks (WANs) such as the Internet or cellular networks, and/or cloud networks, among other possibilities. Further, the communication networks and/or links that make up each of the respective communication paths 106 with the back-end computing platform 102 may be wireless, wired, or some combination thereof, and may carry data according to any of various different communication protocols. Further yet, communications over each of the respective communication paths 106 could be carried out via an Application Programming Interface (API), among other possibilities. Still further, although not shown, the respective communication paths 106 between the client devices 104 and the back-end computing platform 102 may also include one or more intermediate systems. For example, it is possible that the back-end computing platform 102 may communicate with a given client device 104 via one or more intermediary systems, such as a host server (not shown). Many other environments are also possible.

Although not shown in FIG. 1, the back-end computing platform 102 may also be configured to receive data, such as data related to a construction project, from one or more external data sources, such as an external database and/or another back-end computing platform or platforms. Such data sources—and the data output by such data sources—may take various forms.

It should be understood that the network environment 100 depicted in FIG. 1 is one example of a network environment in which a construction management software application may be implemented. Numerous other arrangements are possible and contemplated herein. For instance, other network configurations may include additional components not pictured and/or more or fewer of the pictured components.

When a given party (e.g., a company or individual involved in the construction industry) wishes to utilize an existing construction management software application, the given party may begin by (i) creating an account with the construction management software application and (ii) adding a set of one or more individuals associated with the given party as users on the given party's account. Thereafter, the construction management software application may enable the users of the given party to create, store, view, and/or interact with digital data related to construction projects that involve the given party. For instance, for each of one or more construction projects that involve the given party, the construction management software application may enable users of the given party to create a new project workspace for the construction project (or join an existing project workspace for the construction project that was previously created) and then (ii) create, store, view, and/or interact with any of various types of digital data objects related to the construction project.

As some representative examples, the types of digital data objects that may be supported by a construction management software application may include submittal data objects (e.g., a data object comprising data that represents an item submitted by a responsible contractor to a general contractor of a construction project for review and approval), schedule-item data objects (e.g., a data object comprising data that represents a task, event, or milestone within a schedule for a construction project), observations data objects (e.g., a data object comprising data that represents observed conditions and/or associated effects of said conditions during a construction project at a point in time during the course of the construction project), punch item data objects (e.g., a data object comprising data that represents a work item on a construction project that must be completed to conform to a construction project's contract specifications), daily log data objects (e.g., a data object comprising data that represents construction activity within a given timeframe, such as a day), request for information (RFI) data objects (e.g., a data object comprising data that represents request for information from one user/party to another user/party and/or the information provided in response to said request), inspection data objects (e.g., a data object comprising data that represents an inspection of a site at some point in time during the course of a construction project), specification data objects, drawing data objects, and/or building information model (BIM) data objects, among other types of project-related data objects. In some cases, the construction management software application may also support other types of data objects that are not specific to any particular construction project, such as data objects related to the party or a particular user of the party, among other possibilities.

In practice, many of the data objects created within a construction management software application are stored by the back-end computing platform hosting the construction management software application (e.g., back-end computing platform 102) in the form of structured data within a tabular database comprising rows and columns, where the rows within the relational data store represent the data objects and the columns within the database that represent a defined set of attributes (or sometimes referred to as "data fields") contained within the data objects. For instance, such a tabular database may comprise a first database table that stores data objects of a first type containing values for a first set of attributes, a second database table that stores data objects of a second type containing values for a second set of attributes, and so on for each different type of data object. One common type of tabular database is a relational data store such as a Structured Query Language ("SQL") database, which includes tables in the form described above and also provides the capability to establish links (or relationships) between the data objects stored in different tables (e.g., via columns representing common attributes).

When data objects for a construction management software application are stored in a relational data store, the back-end computing platform hosting the construction management software application typically retrieves data from the relational data store by generating and executing a structured query, which comprises a command for retrieving certain data from the relational data store that follows a defined structure. For instance, if the relational data store is an SQL database, then a structured query for retrieving data from the database may take the form of an SQL query that follows the structure defined by SQL, which generally requires a SELECT clause that specifies the column(s) to retrieve, a FROM clause that specifies the table(s) to query, a WHERE clause that specifies the condition(s) to apply to determine which rows to return, and perhaps one or more other optional clauses that may be included within an SQL query (e.g., ORDER BY, GROUP BY, JOIN, BETWEEN, IN, etc.), including but not limited to clauses that can be utilized to perform logical and/or mathematical operations on values contained within the relational data store (e.g., summing or averaging values within a given column across multiple rows).

There are many advantages to storing data objects for a construction management software application within a relational data store and using structured queries to retrieve data from the relational data store. For instance, structured queries within a relational data store generally enable data to be retrieved quickly, efficiently, and accurately, which allows the back-end computing platform hosting the construction management application to return results to a user in a quick and efficient manner. Further, because structured queries follow a defined structure, they provide predictability in terms of what needs to be included in the structured query and what results will be returned by the structured query. Further yet, structured queries can be used to quickly and efficiently perform logical and/or mathematical operations on large volumes of data contained within the relational data store, which allows the back-end computing platform hosting the construction management application to answer questions raised by users that are more complex in nature. Storing data objects within a relational data store and using structured queries to retrieve data from the relational data store provides various other advantages as well.

However, storing data objects for a construction management software application within a relational data store and using structured queries to retrieve data from the relational data store also gives rise to certain disadvantages. For instance, one key disadvantage to this approach is that all of the structured queries must conform to a defined structural format, such as the SQL format described above, which makes this approach less user friendly than other types of searching technology. Indeed, in order to construct a proper structured query for retrieving data within a relational data store, a user typically needs to either be familiar with the defined structural format that governs the structured query or needs to utilize a software tool that will guide the user through the process of constructing the structured query.

To facilitate this functionality, some existing construction management software applications may include a software tool that enables users to construct structured query for retrieving data for a construction management software application, which may take the form of (i) a back-end software component (or sometimes referred to as a "service") for executing structured queries within a relational data store, where the back-end software component is accessible via an API or the like, and (ii) a front-end software component that functions to guide a user through a workflow for constructing a structured query, generate a structured query based on the user's input, and then pass the structured query to the back-end software component via the API so as to cause the back-end service to execute the structured query within the relational data store. In this respect, such a front-end software component may present a user with a user interface through which the user can provide input that indicates the column(s) to retrieve (e.g., the attributes of the data objects), the table(s) to query (e.g., the types of data objects), the condition(s) to apply to determine which rows to return (e.g., conditions related to the attribute values of the data objects), and perhaps also the logical and/or mathematical operation(s) to perform on the retrieved values, among other possible types of user input that may be captured via the front-end software component's user interface.

For instance, as one representative example, Procore's existing construction management software application includes a "Reporting" tool that enables users to construct structured queries for data stored within a relational data store (e.g., a database, a data warehouse, etc.) of, or accessible to, the construction management software application, which comprises a (i) a back-end software component (or sometimes referred to as a "service") for executing structured queries within a relational data store, where the back-end software component is accessible via a "Reporting" API, and (ii) a front-end software component that functions to guide a user through a workflow for constructing a structured query, generate a structured query based on the user's input, and then pass the structured query to the back-end software component via the Reporting API so as to cause the back-end software component to execute the structured query within the relational data store. An example of the user interface for Procore's existing Reporting tool is shown in FIG. 2.

Figure 2:
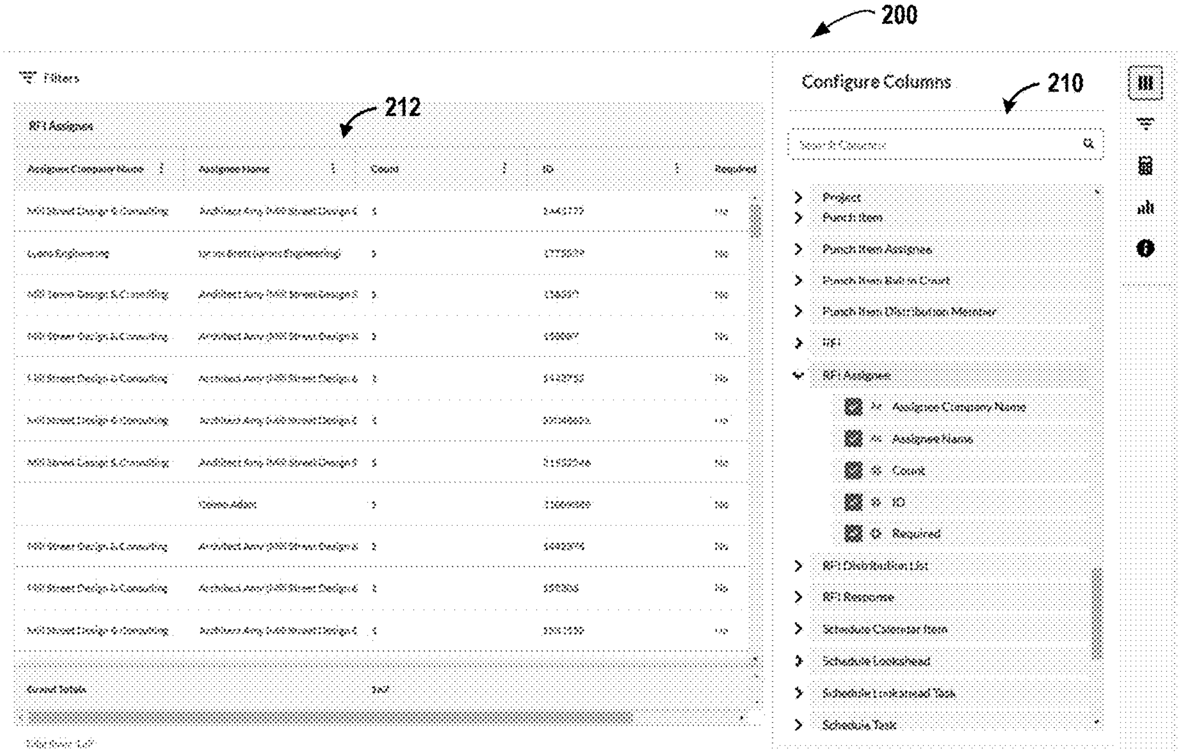
FIG. 2 depicts an illustrative example of a reporting tool GUI view that provides an input interface for a user to input selections for structured data to be used in generating a report, according to the present disclosure.

As shown, FIG. 2 illustrates a GUI view 200 that provides an input interface within the Reporting tool that allows a user to input selections of structured data for the Reporting tool to use in generating a report. The Reporting tool may present the user with a set of input-control elements 210, which may be utilized by the user to identify structured data for the Reporting API to retrieve from a relational data store for use in a report. For instance, the input-control elements 210 may be configured to enable a user to identify subsets of structured data of a relational data store associated with a construction project based on predefined labels for the subsets.

As shown, the input-control elements 210 may take the form of a series of drop-down lists each labeled with a label (e.g., "Project," "Punch Item," "RFI," "RFI Assignee," etc.) that indicates an attribute ("attribute labels") for a set of structured data within the relational data store. For example, the attribute labels may indicate an attribute (e.g. "RFI Assignee") of a type of data object (e.g., RFIs), contained in the relational data store that is available for retrieval via the Reporting API. When clicked, each dropdown list drops down to show a set of checkboxes having labels associated with sub-attributes ("sub-attribute labels") of the attribute indicated by the attribute label of the clicked drop-down list (e.g., an "RFI Assignee" drop-down list, when clicked, causes the GUI view 200 to show RFI Assignee checkboxes that may include an "Assignee Company Name" checkbox, an "Assignee Name" checkbox, a "Count" checkbox, an "ID" checkbox, a "Required" checkbox, etc.). If any of the set of checkboxes is clicked, a set of structured data identified by the sub-attribute label of the clicked checkbox is then retrieved, via the Reporting API, for generating a report. For instance (and as illustrated), when a checkbox is selected a column containing a set of structured data associated with the sub-attribute label is retrieved via the Reporting API (e.g., columns associated with_an "Assignee Company Name," an "Assignee Name," a "Count," an "ID," "Required," etc.). As shown, a visual representation of each retrieved column, when selected, may be presented to a user of the Reporting tool via a table 212 in the GUI view 200. In an example, the table 212 may dynamically update (e.g., add or remove columns) in response to input via the input-control elements 210 (e.g., when a user selects or deselects the checkboxes).

Data retrieval in response to user input via the input-control elements may take any of various forms. For example, in response to the user input, the Reporting API may execute a structured query on the relational data store to return the requested sets of structured data. This may take the form of an SQL query executed on the relational data store. However, the data retrieval may take various other forms, as well.

However, requiring users to construct structured queries in this manner gives rise to several problems. First, requiring a user to construct a structured query utilizing a user interface such as the one shown in FIG. 2 can be cumbersome, time consuming, and prone to error. For example, consider that a user would like the construction management software application to show the user all overdue RFIs and Submittals that are in Joe's court (meaning, overdue RFIs and Submittals that, at this time, are assigned to Joe). For a user to gain access to the answer to this question using the Reporting tool, the user would have to create a report and select multiple columns each representative of a data field of either a RFI or submittal type of data object (e.g., a column for an identifying number for RFIs, a column for a subject for RFIs, a column for an identifying number for submittals, and a column for submittal titles, etc.) and then add multiple filters to filter the data contained in the columns to only show the RFIs and submittals that are in Joe's court (e.g., a filter that only shows RFIs that are overdue, a filter that only shows RFIs that are in Joe's court, a filter that only shows overdue submittals, a filter that only shows submittals that are in Joe's court, etc.). This may be a cumbersome task for the user, as it requires several steps to complete, but also because it necessitates that the user knows and/or remembers which columns to select and filter.

Second, even when presented with a user interface such as the one shown in FIG. 2, users may still have difficulties transforming a question that the user wishes to have answered by the construction management software application into a structured query. Notably, both of these problems also become more prevalent as the complexity of a user's question increases, and, when the user's question reaches a certain level of complexity, it may become practically impossible for user to construct a structured query that completely and accurately represents the user's question.

For these and other reasons, existing construction management software applications have begun to incorporate technology that enables users to input questions in the form of unstructured, natural-language queries rather than structured queries. One possible example of this technology may take form of (i) a back-end software component (or sometimes referred to as a "service") for executing semantic searches within a vector database comprising sets of vector embeddings that are generated for stored data objects, where the back-end software component is accessible via an API or the like, and (ii) a front-end software component that functions to receive a user's natural-language query (e.g., a typed or spoken question) and then pass the natural-language query to the back-end software component via the API so as to cause the back-end software component to transform the user's natural-language query into a set of one or more vector embeddings, generating a search query comprising the set of one or more vector embeddings, and then performing the semantic search within the relational data store. In this respect, one or more artificial intelligence ("AI") models referred to as "embedding models" may be utilized to generate the vector embeddings for the stored data objects and the user's natural-language query.

This technology for enabling users to input questions in the form of natural-language queries and then performing a semantic search in order to respond to the user questions may provide certain advantages over technology that requires users to input their questions in the form of structured queries that are executed within a structured database, including that it provides a better user experience, Indeed, if a user has a question that the user wishes to have answered by a construction management software application, it is quicker, more efficient, and less error prone for the user to simply type or speak the question in its natural-language form, rather than accessing and utilizing a user interface to construct a structured query that represents the question. However, this alternative technology for responding to user queries brings its own set of problems.

For instance, one problem with this alternative technology is that it requires substantial compute resources in order to generate and maintain a vector database comprising vector embeddings for the stored data objects. Indeed, this alternative technology typically requires an embedding model to first be trained (or at least fine-tuned) based on domain-specific data and then requires the embedding model to be utilized to generate a respective set of one or more vector embeddings for each stored data object, which involves substantial compute resources.

Another problem with this alternative technology is that a semantic search within a vector database tends to be less accurate than a structured search within a relational data store, which is generally more precise.

Yet another problem with this alternative technology is that a semantic search within a vector database generally does not allow for the same types of logical and/or mathematical operations as a structured search within a relational data store, which in turn limits the types of questions that can be answered using semantic search. For example, when using a semantic-search-based approach, it is typically not possible to specify an aggregation operation on a large number of rows (e.g., a sum of values from many rows, an average value of a certain measure, etc.), which means that any such aggregation operation must be handled by some other software component that would need to be added on top of the search component.

To address these and other problems with existing construction management software applications, disclosed herein is new software technology that enables a user to input a question in the form of a natural-language request and then transforms the natural-language request into a structured query that can be executed in order to retrieve data from a relational data store for purposes of answering the user's question.

At a high level, the disclosed software technology may take the form of an AI-based software architecture that is configured to perform functionality that involves (i) receiving a user query comprising a natural language request, (ii) using a generative AI model to transform the natural-language request into a structured query that can be passed as input to a search component that is accessible via a given API, (iii) sending the structured query to the search component via the given API, (iv) receiving, from the search component via the given API, search results comprising a dataset that is generated returned on the structured query, (v) based on the search results, generating a response to the natural language request, and (vi) causing the generated response to be presented to the user. The disclosed AI-based software architecture and its corresponding functionality is described in further detail below.

The disclosed AI-based architecture may improve upon the existing construction management software applications in various ways. For example, the disclosed AI-based architecture may provide an accurate, efficient, and reliable new approach to generating answers to users' natural-language queries within a construction management software application, beyond what can be accomplished using semantic search. By utilizing the disclosed AI-based software architecture, natural-language queries that would not be best answered via semantic search can now be accurately answered, due to the natural-language queries being transformed into a structured query that is then utilized by a generative AI model to generate a natural-language response. Further still, by enabling a user to receive natural-language responses to natural-language queries that, in the past, would have required an analysis of structured data, a whole world of data-driven knowledge is opened up to a new set of users of the construction management software application.

For instance, consider that a user of the construction management software application may not know the specific attributes of data objects that the user must enter into the Reporting tool to retrieve the data that the user needs to answer a question. However, if, instead, the user utilizes the disclosed AI-based software architecture to retrieve an answer to the question (e.g., via interfacing with a chat interface, an AI-assistant, etc.), the user does not need to know these specific attributes of data objects to get the answer—the user merely needs to pose the question in the user's own words (e.g., via a natural-language query). Accordingly, the disclosed technology may provide an enhanced user experience for users of a construction management software application.

The disclosed AI-based software architecture also provides other improvements over existing construction management software applications, as will be appreciated based on the discussion that follows.

In practice, the disclosed software technology may be integrated into a construction management software application or provided as a standalone software tool, among other possibilities. For instance, as one possible implementation, the disclosed software technology may be integrated into a construction management software application comprising both front-end software running on client devices (e.g., client devices 104 of FIG. 1) that are accessible to individuals associated with construction projects (e.g., contractors, project managers, architects, engineers, designers, etc.) and back-end software running on a back-end computing platform (e.g., back-end computing platform 102 of FIG. 1) that interacts with and/or drives the front-end software. In this respect, the disclosed software may be implemented as part of an AI-based digital assistant for the construction management software application and/or as part of the software tools included within the construction management software application, among other possibilities. The disclosed software technology may be implemented in other manners as well.

Figure 3:
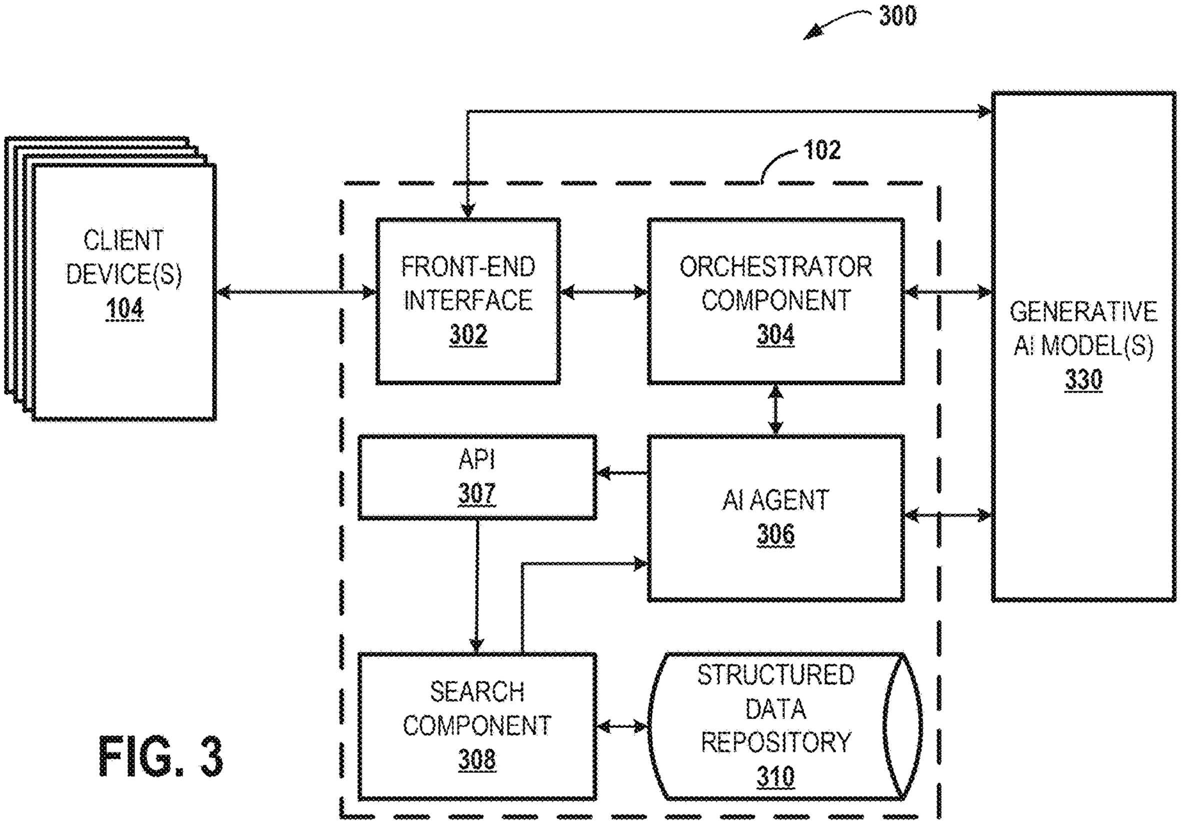
FIG. 3 depicts an illustrative example of an AI-based software architecture that enables a user to input a question in the form of a natural-language request and then transforms the natural-language request into a structured query that can be executed in order to retrieve data from a relational data store for purposes of answering the user's question, according to the present disclosure.

Turning now to FIG. 3, an example of the disclosed AI-based software architecture 300 is illustrated. In practice, the example AI-based software architecture may be encoded in the form of program instructions that are executable by one or more processors of a computing platform, and for purposes of illustration, the example AI-based software architecture 300 is described as being installed on and executed by the back-end computing platform 102, but it should be understood that the example AI-based software architecture 300 may be installed on and executed by any one or more computing platforms that are capable of performing the example operations of the AI-based software architecture 300. Further, it should be understood that the example AI-based software architecture 300 is merely described in this manner for the sake of clarity and explanation and that the disclosed functionality of the AI-based software architecture 300 may be implemented in various other manners, including the possibility that operations may be added, removed, rearranged into different orders, combined into fewer blocks, and/or separated into additional blocks depending upon the particular example.

As shown, the example AI-based software architecture 300 comprises a front-end interface 302, an orchestrator component 304, an AI agent 306 that performs functionality for initiating structured searches based on natural-language queries, a search component 308 for performing structured searches that is accessible via a given API 307, and a structured data repository 310. Additionally, as shown in FIG. 3, the AI-based software architecture 300 may interface with client devices 104 running front-end software for the construction management software application, which may include front-end software for the disclosed software technology. Additionally yet, as shown in FIG. 3, the AI-based software architecture 300 may interface with at least one generative AI model 330, which may either be hosted on a separate computing platform that is accessible over a network-based communication path (e.g., via an API or the like) or be hosted on the back-end computing platform 102. Each of these components will now be described in further detail.

To begin, the front-end interface 302 generally functions to interface with client devices running the front-end software for the construction management software application, such as the client devices 104 of FIG. 1, so as to receive communications from the client devices 104 via the communication paths 106 and/or send communications to the client devices 104 via the communication paths 106. For instance, at a high level, the functionality performed by the front-end interface 302 in accordance with the present disclosure may involve (i) receiving, from a client device 104, a natural-language query that was input by a user, (ii) passing the received natural-language query to the orchestrator component 304, (iii) receiving a response to the natural-language query from the orchestrator component 304, and (iv) sending the response to the client device 104 and thereby causing the client device 104 to present the response to the user.

The natural-language query may take any of various forms. For instance, the natural-language query may take the form of text input and/or speech input that is input to the client device 104 via an interface presented to a user by front-end software running on the client device 104. For instance, the natural-language query may comprise a question that the user would like answered by the construction management software application based on data that is accessible by the construction management software application. The natural-language query may include language, which, when read/heard in context as a question posed to the construction management software application, conveys a question that one would recognize as a question that the user would like answered by the construction management software application. The natural-language query may be related to a construction project managed via the construction management software application.

In one illustrative example, a natural-language query may contain the text or speech that says "How many RFIs are assigned to me?" This natural-language query conveys a question that the user would like answered based on data, because "how many" conveys that the user wants to know a quantity of something (which could be a data value), "RFIs" conveys subject of the quantity and that the subject is a construction-related task represented by data objects, "that are assigned to him" indicates values for a data field (e.g., an "assignee" data field) of the data objects. If this question is transformed into a structured query (e.g., "FROM RFIs, WHERE assignee=user;" as an SQL query) that, when executed, causes the search component 308 to return a set of RFI data objects, return each RFI data object that includes a value of "[user's name]" in an "assignee" field for each returned RFI data object. Then, the returned set of RFI data objects may, for example, be utilized by the orchestrator component 304 to determine the response to the natural-language query.

Further, in practice, a natural-language query may be input by the user in any of various manners. For instance, as one possibility, a user may access and use the front-end software running on the client device 104 to input a text-based natural-language query and/or voice-based natural-language query (e.g., via a chat interface or the like). In this respect, the client device 104 may then encode the user's natural-language query into a communication that is sent to the back-end computing platform 102. In practice, this communication may take the form of one or more messages (e.g., one or more HyperText Transfer Protocol (HTTP) messages) that are sent over the communication path 106 between the client device 104 and the back-end computing platform 102, and in at least some implementations, the communication may be sent via one or more APIs.

The front-end interface 302 may perform other functions as well, including but not limited to the possibility that the front-end interface 302 may exchange other types of communications from the client devices 104 that do not involve natural-language queries.

Further, in other implementations, the front-end interface 302 may be configured to pass requests to and/or receive responses from other components of the AI-based software architecture 300, including but not limited to the possibility that the front-end interface 302 could receive a response to the natural-language query from a component other than the orchestrator component 304.

As noted above, after the natural-language query is received by the front-end interface 302, the front-end interface 302 may pass the natural-language query to the orchestrator component 304, which may generally function to (i) receive the natural-language request, (ii) determine whether the natural-language query relates to structured data, (iii) based on the determination, route the natural-language query to either the AI agent 306 if the natural-language query relates to structured data or another software component (e.g., an AI agent that performs functionality for initiating a vector-based semantic search) if the natural-language query does not relate to structured data, (iv) receive search results related to the natural-language query, (v) based on the search results, generate a response to the natural-language query, and (vi) pass the response back to the front-end interface 302. Each of these functions may take any of various forms.

To begin, the function of receiving the natural-language request from the front-end interface 302 may involve receiving the natural-language request from the front-end interface 302 via an internal communication path (e.g., an internal API, a messaging queue or bus, or some other form of inter-process communication).

Further, the function of determining whether the natural-language query relates to structured data may be carried out using the generative AI model 330, a discriminative AI model, and/or a rule-based model, among other possibilities. For instance, the orchestrator component 304 may utilize the generative AI model 330 to determine whether the natural-language query relates to structured data by (i) generating a prompt for the generative AI model 330 comprising a request to determine whether the natural-language query relates to structured data, (ii) pass the prompt as input to the generative AI model 330, (iii) receive a response from the generative AI model 330 comprising a prediction of whether the natural-language query relates to structured data, and then (iv) use that prediction as a basis for determining whether the natural-language query relates to structured data, which in turn serves as the basis for determining whether to route the natural-language query to the AI agent 306 or some other software component.

The function of determining whether the natural-language query relates to structured data may also take other forms.

Further, the orchestrator component's function of routing the natural-language query to either the AI agent 306 if the natural-language query relates to structured data or another software component if the natural-language query does not relate to structured data may involve sending the natural-language query to either the AI agent 306 or the other software component via an API, a messaging queue or bus, or some other form of inter-process communication, among other possibilities.

Further yet, the orchestrator component's function of receiving search results related to the natural-language query may involve receiving such search results via an API, a messaging queue or bus, or some other form of inter-process communication.

Still further, the orchestrator component's function of generating a response to the natural-language query based on the search results may take any of various forms, and in at least some implementations, may be carried out utilizing the generative AI model 330 by (i) generating a prompt for the generative AI model 330 comprising a request to generate a response to the natural-language query based on the search results (which may include a dataset that is returned based on a structured query generated by the AI agent 306), (ii) pass the prompt as input to the generative AI model 330, (iii) receive a response from the generative AI model 330 comprising a generated response to the natural-language query.

Still further yet, the orchestrator component's function of passing the response back to the front-end interface 302 may involve sending the response to the front-end interface 302 via an API, a messaging queue or bus, or some other form of inter-process communication.

As an optional function, the orchestrator component 304 may function to generate a report related to the natural-language query that is based on the search results (which may include a dataset that is returned based on a structured query generated by the AI agent 306). In some such examples, functionality of the orchestrator component 304 may further involve: (i) generating a prompt for the report related to the natural-language query that is based on the search results, (ii) pass the prompt as input to the generative AI model 330, (iii) receive a response from the generative AI model 330 comprising a generated report related to the natural-language query.

In one possible implementation, the report related to the natural-language query may be presented to a user in response to the user selecting a link on a GUI view of the client device 104, the GUI view presented in response to the natural-language request. As another example, the report related to the natural-language query may be presented to the user visually when requested (e.g., as a chart, as a data table, as text, etc.). The report may take any of various other forms.

The functionality of the orchestrator component 304 may take other forms as well.

As noted above, if the natural-language query is related to structured data, the orchestrator component 304 may route the natural-language query to the AI agent 306 that performs functionality for initiating structured searches based on natural-language queries. In practice, the AI agent 306 may comprise a software component that provides an interface to a respective AI model (e.g., the generative AI model 330) and is preconfigured to perform particular AI-based functionality in order to accomplish a respective type of task that is preconfigured for the AI agent 306. However, it should be understood that in other implementations, the plurality of AI agents 306 may each be implemented in the form of a discrete configuration file (e.g., a YAML file) that, when loaded and executed by a centralized execution engine (e.g., an agent executor), causes the centralized execution engine to perform the functions for the AI agent. The AI agent 306 may take other forms as well.

At a high level, the AI-based functionality that the AI agent 306 performs to initiate a structured search based on a natural-language query may involve (i) receiving the natural-language query from the orchestrator component 304 (or some other software component), (ii) generating a prompt for the generative AI model 330 that comprises a request to transform the natural-language query into a structured query that can be passed as input to the search component 308 via the given API 307, (iii) passing the prompt as input to the generative AI model 330, (iv) receiving a response from the generative AI model 330 comprising a structured query that is generated by the generative AI model 330, (v) passing the structured query to the search component 308 via the given API 307 so as to cause the search component 308 to perform a structured search in accordance with the structured query, (vi) receiving, from the search component 308, search results comprising a dataset that is returned based on the structured query, and (vii) passing the search results back to the orchestrator component 304. Each of these functions may take any of various forms.

To begin, the function of receiving the natural-language query from the orchestrator component 304 may involve receiving the natural-language request from the orchestrator component 304 via an internal communication path (e.g., an internal API, a messaging queue or bus, or some other form of inter-process communication).

Further, the prompt may take any of various forms and the functionality for generating the prompt may also take any of various forms. For example, the prompt may additionally include configuration data related to the relational data store. In an example, the configuration data may comprise database-schema data for the relational data store. Database-schema data may comprise a list of structures of data that are contained in the relational data store. Accordingly, database-schema data may contain information about structure of the relational data store and how these structures are labeled (e.g., numbers of tables, table names, object names, object types, data fields, etc., along with relationships between sets of this information).

In another example, the configuration data may comprise database metadata from the relational data store. Database metadata may refer to data that provides information about the structured data contained in the relational data store. For example, database metadata may summarize basic information about data that is used for tracking and working with specific structured data. Some examples of database metadata that may be included in the configuration data include, but are not limited to including, how the structured data was created (e.g., via what software tool of the construction management software application, by what user of the construction management software application, etc.), time and date of creation of the structured data, a creating user of the structured data, permissions to access the structured data, file size of a set of structured data, a source of the structured data, etc. Database metadata may take various other forms, as well.

In some examples, the AI agent 306 may have access to predefined configuration data that may be utilized in generating the prompt. In an alternative example, the AI agent 306 may retrieve the configuration data in advance of generating the prompt. In this example, the AI agent 306 may perform functionality that involves: (i) generating a request to retrieve the configuration data, (ii) passing the request to the search component 308 via the given API 307 so as to cause the search component 308 to return the configuration data, and (iii) receiving, from the search component 308, the configuration data based on the request to retrieve the configuration data.

The functionality for generating the prompt for that comprises a request to transform the natural-language query into a structured query may take various other forms, as well.

Returning again to the functionality of the AI agent 306, each the AI agent's functions of passing the generated prompt to the generative AI model 330, receiving the response from the generative AI model 330 comprising the one or more selected function calls, which may depend in part on where the generative AI model 330 is hosted. For instance, in an implementation where the generative AI model 330 is hosted on a separate computing platform from the back-end computing platform 102, these functions may involve sending the generated prompt to the generative AI model 330 over an external network-based communication path (e.g., via an API or the like) and then receiving the response from the generative AI model 330 over the external network-based communication path. Alternatively, in an implementation where the generative AI model 330 is hosted on the back-end computing platform 102, these functions may involve sending the generated prompt via an internal communication path (e.g., an internal API, a messaging queue or bus, or some other form of inter-process communication) and then receiving the response from the generative AI model 330 over the internal communication path. The functions the AI agent 306 performs to pass the generated prompt to the generative AI model 330 and to receive the response from the generative AI model 330 may take other forms as well.

Further, the function of passing the structured query to the search component 308 so as to cause the search component 308 to perform a structured search in accordance with the structured query is described above as being passed via the given API 307. However, in alternative examples, passing the structured query to the search component 308 so as to cause the search component 308 to perform a structured search in accordance with the structured query passing may involve passing the structured query to the search component 308 via another internal communication path (e.g., a an API different from the API 307, a messaging queue or bus, or some other form of inter-process communication). This functionality may take various other forms, as well.

The function of receiving, from the search component 308, search results comprising a dataset that is returned based on the structured query may involve receiving the search results comprising a dataset that is returned based on the structured query via an internal communication path (e.g., an internal API, a messaging queue or bus, or some other form of inter-process communication).

Lastly, the function of passing the search results back to the orchestrator component 304 may involve passing the search results back to the orchestrator component 304 via an internal communication path (e.g., an internal API, a messaging queue or bus, or some other form of inter-process communication).

The functionality of the AI agent 306 may take various other forms as well.

The search component 308 generally functions to (i) receive a structured query via the given API 307, (ii) perform a search in accordance with the structured query, and (iii) return search results comprising a dataset that is returned based on the structured query.

In this respect, the structured query that may be received by the search component 308 via the given API 307, may take any of various forms, including but not limited to any of the forms previously described.

Further, the search component's function of performing the search in accordance with the structured query may take any of various forms. For purposes of illustration, the functionality of the search component 308 will be described below with reference to structured data in the form of data objects in a relational data store, but it should be understood that the functionality applies equally to other forms of structured data (e.g., data values of individual fields of data objects).

As one possible implementation, the search component 308 may utilize a text-based search technique (sometimes referred to as a keyword or full-text search) to search for a candidate set of data objects that are stored in a relational data store on the structured data repository 310 (e.g., in the values for the data fields defined for the data objects) based on instructions contained in the structured query. One representative example of a text-based search technique may comprise a Best Match 25 (bm25) search technique, but other text-based search techniques may be utilized as well.

As one example, consider that a user inputs a natural-language query "How many RFIs are assigned to me?" as input to the AI-based software architecture 300. Based on this natural-language query, the generative AI model may return the following structured query (e.g., in SQL format):

"FROM RFIs
WHERE assignee=user;"

This structured query provides instructions to the search component 308 to retrieve RFI data objects from an RFI data table that have the user listed as the assignee (e.g., the command indicates to the search component to retrieve data objects FROM an "RFIs" data table and to only retrieve objects WHERE the value for an "assignee" field is "user").

The search component 308 may utilize, for example, the text-based search technique to locate the words in the structured query to execute these commands. In some examples, words in the structured query may have been generated by the generative AI model based on configuration data (e.g., database metadata) that was provided in the prompt for generating the structured query. In an example, the configuration data may comprise identifying data associated with the relational data store (e.g., names of data tables in the relational data store, names of types of data objects associated with data tables, names of columns of data tables, names of data fields in data objects, etc.), that can be referenced in the structured query.

After searching the relational data store in accordance with the structured query, the search component 308 may generate search results comprising a dataset that is returned based on the structured query. For instance, as one possibility, the dataset that is returned based on the structured query may comprise a set of data objects returned in response to the structured query. However, the dataset may take various other forms.

In line with the discussion above with respect to the AI agent 306, the search component may optionally function to: (i) receive a request to retrieve configuration data, (ii) perform a search in accordance with the request to retrieve configuration data, and (iii) return results of the search in accordance with the request to retrieve configuration data to the AI agent 306.

The functionality of the search component 308 may take various other forms as well.

The structured data repository 310 may comprise any repository for storing structured data, including but not limited to a repository that is configured to serve as a relational data store. For instance, the structured data repository 310 may serve as a relational data store that comprises a tabular database having rows and columns, where the rows within the relational data store represent the data objects and the columns within the database that represent a defined set of attributes (or sometimes referred to as "data fields") contained within the data objects.

The structured data repository 310 may take any of various forms. For example, the structured data repository 310 may comprise a data storage layer accessible by the back-end computing platform 102, as discussed above with respect to FIG. 1.

The structured data repository 310 may take various other forms as well.

Turning next to the generative AI model 330, in line with the discussion above, the generative AI model 330 may generally function to (i) receive a prompt comprising a request to perform a task, (ii) perform the task, (iii) generate a response to the request that indicates the results of performing the task, and (iv) return the response to the software component from which the prompt was received.

For instance, as discussed above, the generative AI model 330 may receive a prompt from the orchestrator component 304 comprising a request to determine whether the natural-language query relates to structured data, in which case the generative AI model 330 may then function to predict whether the natural-language query relates to structured data, generate a response comprising the prediction, and return the response to the orchestrator component 304.

Further, as discussed above, the generative AI model 330 may receive a prompt from the AI agent 306 comprising a request to request to transform the natural-language query into a structured query that can be passed as input to the search component 308 via the given API 307, in which case the generative AI model 330 may then function to generate the structured query and return a response comprising the structured query to the AI agent 306.

Further yet, as discussed above, the generative AI model 330 may receive a prompt from the orchestrator component 304 comprising a request to generate a response to the natural-language query based on the search results, in which case the generative AI model 330 may then function to generate the response to the natural-language query and return it to the orchestrator component 304.

The generative AI model 330 may receive various other types of requests and perform various other tasks as well.

The generative AI model 330 may take any of various forms. For instance, the generative AI model 330 may be a transformer-based model (e.g., a language model such as a large language model (LLM) and/or a multimodal model such as a vision-language model (VML)), a diffusion model, a model based on a generational adversarial network (GAN), and/or a model based on a variational autoencoders (VAEs), among other possible types of generative AI models. Further, the generative AI model 330 may comprise a pre-trained generative AI model (e.g., an "off-the-shelf" generative AI model) that may or may not be further trained (e.g., via fine tuning, few-shot learning, or the like), or may comprise a generative AI model that is trained in the first instance to perform the tasks described herein, among other possibilities. Some representative examples of pre-trained generative AI models include a generative pre-trained transformer (GPT) type of generative AI model, a bidirectional encoder representations from transformers (BERT) type of generative AI model, a bidirectional auto-regressive transformer (BART) type of generative AI model, a text-to-text transfer transformer (T5) type of generative AI model, a pre-training with extracted gap sentences for abstractive summarization (PEGASUS) type of generative AI model, a large language model meta AI (LlaMA) type of generative AI model, a Phi-2 or Phi-3 type of generative AI model, a PaliGemma type of generative AI model, and/or a Florence-2 type of generative AI model, among other examples. The generative AI model 330 may take other forms as well.

As discussed above, in some implementations, the generative AI model 330 may be hosted on a computing platform that is separate from the back-end computing platform 102, in which case the generative AI model 330 may be accessed over a network-based communication path (e.g., via an API or the like), while in other implementations, the generative AI model 330 may be hosted on the back-end computing platform 102.

It should also be understood that the components of the example AI-based software architecture 300 could interface with multiple different generative AI models 330. For instance, as one possibility, different components of the example AI-based software architecture 300 could be configured to interface with multiple different generative AI models 330, which could be of the same type or of different types. As another possibility, a given component of the example AI-based software architecture 300 (e.g., the AI agent 306) could be configured to interface with multiple different generative AI models 330, which could be of the same type or of different types. Other configurations are possible as well.

The example AI-based software architecture 300 may take various other forms as well. For instance, as one possibility, the example AI-based software architecture 300 may include other components that are not shown or described above but may nevertheless facilitate the functionality disclosed herein. As another possibility, certain of the components shown and described above could be combined together or separated out into multiple sub-components. For example, the AI agent 306 and/or the orchestrator component 304 may comprise two or more AI agents that are, respectively, configured and trained to perform the disclosed functionality of the AI agent 306 and/or the orchestrator component. As yet another possibility, certain of the components shown and described above may perform additional or different functionality from what is described above. For example, in addition to the functionality described above, the orchestrator component 304 may function to decompose the natural-language query into a set of sub-queries that can be handled separately, and in such an implementation, the orchestrator component 304 (or some other component) may further function to compose a final response to the natural-language query based on the sub-queries (e.g., with the assistance of the generative AI model 330). Other variations of the example AI-based software architecture 300 are possible as well.

Figure 4:
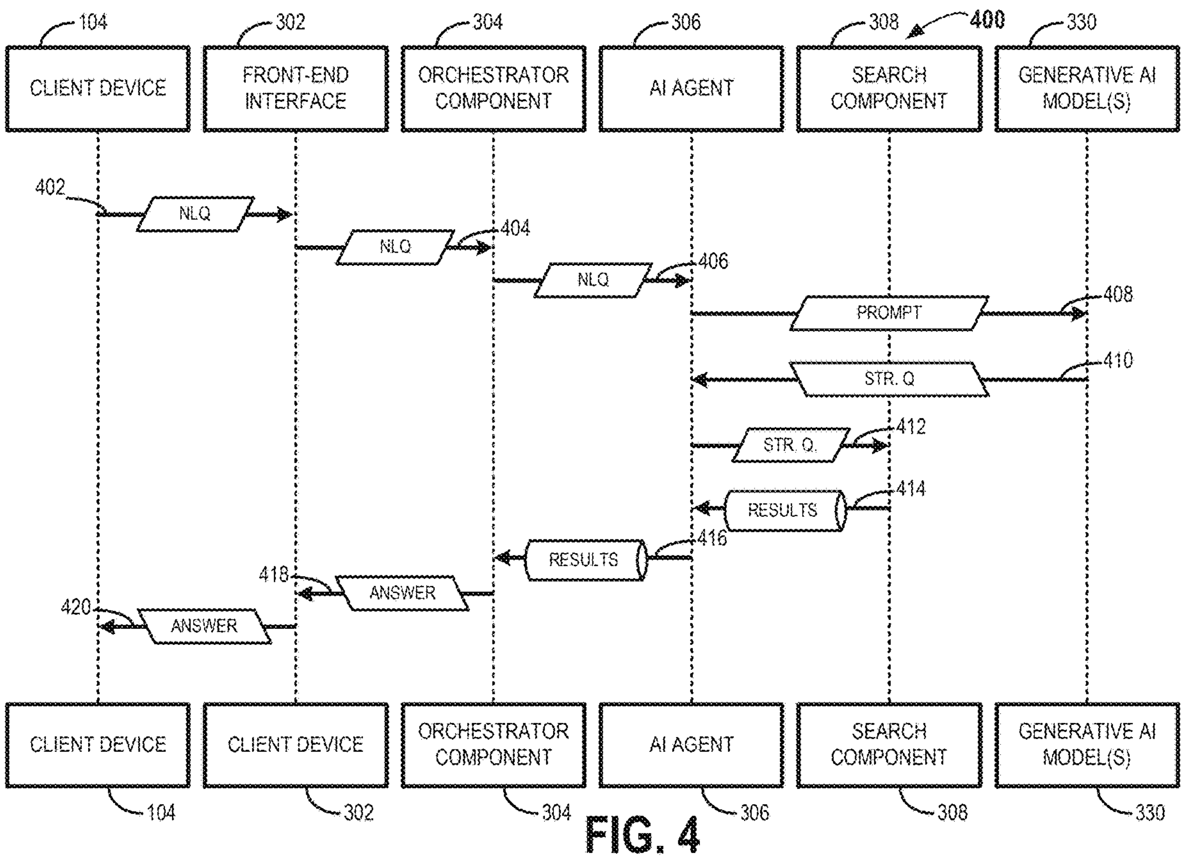
FIG. 4 depicts a timing diagram illustrating an example method using the example AI-based software architecture of FIG. 3, according to the present disclosure.

Turning now to FIG. 4, an example diagram illustrating functionality 400, via the illustrated interaction between software components of the AI-based software architecture 300.

Prior to executing the functionality 400 illustrated by the diagram of FIG. 4, the client device 104 may present a user with an interface that enables the user to enter a natural language query ("NL query" in FIG. 4) to be answered within the construction management software application.

At arrow 402, the client device 104 running front-end software for the construction management software application sends a natural language request ("NLQ" in FIG. 4) to the front-end interface 302. The natural language request may take any of the various forms discussed above, and for purposes of this example, will be assumed to be a natural language request related to a construction project.

Figure 5A:
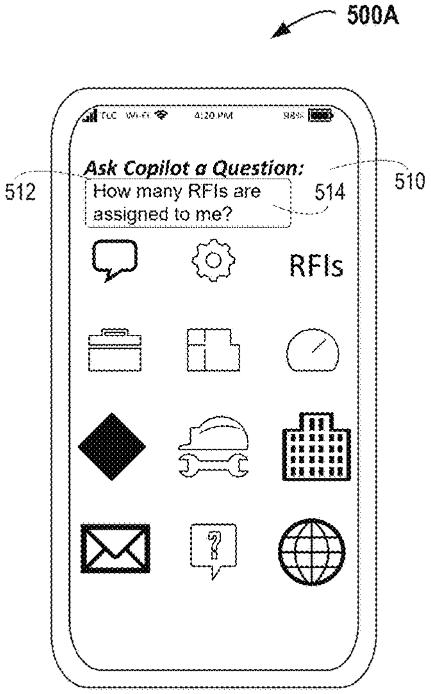
FIG. 5A depicts a first GUI view that may be presented to a user via a front-end component of the example AI-based software architecture of FIGS. 3 and 4, according to the present disclosure.

FIG. 5A shows a GUI view 500A of the client device 104 running front-end software for a construction management software application. As illustrated, the GUI view 500A may comprise a chat interface 510 that includes one or more input-control devices, such as a textbox 512. The chat interface may enable the user to input a natural-language query 514 (e.g., "How many RFIs are assigned to me?") to the AI-based software architecture 300.

In an example, the chat interface 510 may be associated with an AI-based digital assistant of the construction management software platform. However, the chat interface 510 may take various other forms.

At arrow 404, the front-end interface 302 passes the received natural-language request to the orchestrator component 304. After receiving the natural-language request, the orchestrator component 304 determines whether the natural-language query relates to structured data. Determining whether the natural-language query relates to structured data may take any of the various forms discussed above.

At arrow 406, based on the determination, the orchestrator component 304 routes the natural-language query to either the AI agent 306 if the natural-language query relates to structured data or another software component (e.g., an AI agent that performs functionality for initiating a vector-based semantic search) if the natural-language query does not relate to structured data. For the purposes of the example instance illustrated in this timing diagram for the functionality 400, it is assumed that the natural-language query relates to structured data.

At arrow 408, after receiving the natural-language query, the AI agent 306 (i) generates a prompt for the generative AI model 330 that comprises a request to transform the natural-language query into a structured query that can be passed as input to the search component 308 via the given API 307 and (ii) passes the prompt ("PROMPT" in FIG. 4) as input to the generative AI model 330. The prompt may take any of the various forms discussed above, and for purposes of this example, will be assumed to comprise a request to transform the natural-language query into a structured query that can be passed as input to the search component 308 via the given API 307. In some examples, the prompt may further include configuration data associated with the structured data repository.

At arrow 410, after receiving the prompt, the generative AI model 330 (i) generates the structured query and (ii) returns a response comprising the structured query ("STR. Q" in FIG. 4) to the AI agent 306. The structured query may take any of the various forms discussed above.

At arrow 412, after receiving the response from the generative AI model 330 comprising a structured query that is generated by the generative AI model 330, the AI agent 306 passes the structured query to the search component 308.

At arrow 414, after receiving the structured query, the search component 308 returns search results comprising a dataset that is returned based on the structured query ("RESULTS" in FIG. 4). The function of returning the search may take any of the forms discussed above.

At arrow 416 after receiving the search results comprising the dataset that is returned based on the structured query, the AI agent 306 passes the search results to the orchestrator component 304.

At arrow 418, the orchestrator component 304 generates a response to the natural-language query based on the search results and passes the response back to the front-end interface 302.

At arrow 420, after receiving the natural-language query, the front-end interface 302 sends the identification of the final set of data objects to the client device 104 along with an instruction to present the answer to the natural-language query.

Figure 5B:
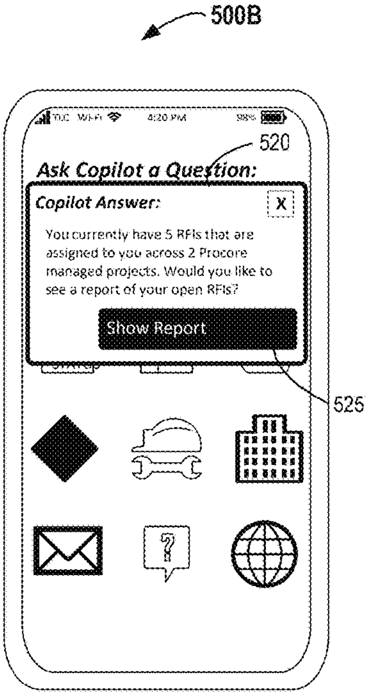
FIG. 5B depicts a second GUI view that may be presented to a user via the front-end component of the example AI-based software architecture of FIGS. 3 and 4, according to the present disclosure.

FIG. 5B shows a GUI view of the client device 104 after the client device receives and presents a visual representation of the answer to the natural-language query. In the illustrated example, the visual representation of the response takes the form of a popup 520 that includes a text answer of the natural-language query input to the client device (e.g., "How many RFIs are assigned to me?" as shown in FIG. 5A). In some examples, the popup 520 may comprise a button 525 which, when clicked, causes the client device 104 to alter the GUI view 500B such that it will now show a report that is related to the answer to the natural-language query.

The popup 520 is shown only for the purposes of illustration and the visual representation of the response may take any of various other forms.

Figure 5C:
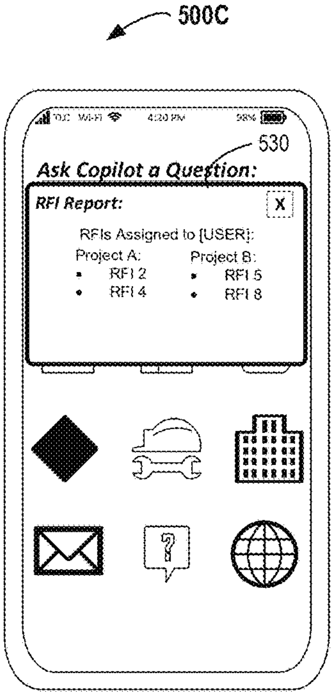
FIG. 5C depicts a third GUI view that may be presented to a user via the front-end component of the example AI-based software architecture of FIGS. 3 and 4, according to the present disclosure.

For example, as illustrated the visual representation of the response may take the form of a report 530, which is shown in FIG. 5C. The report 530 may be another visual representation of the answer to the natural-language query, in addition to the popup 520.

Turning to FIG. 6, example functionality 600 is illustrated in the form of a flow diagram. For purposes of illustration, the example functionality 600 of FIG. 6 is described as being carried out by the back-end computing platform 102 of FIG. 1, which is hosting a construction management software application, but it should be understood that the example functionality 600 of FIG. 6 may be carried out by any computing platform that is capable of running the software disclosed herein. Further, it should be understood that the example functionality of FIG. 6 is merely described in this manner for the sake of clarity and explanation and that the example functionality may be implemented in various other manners, including the possibility that functions may be added, removed, rearranged into different orders, combined into fewer blocks, and/or separated into additional blocks depending upon the particular example.

Starting at block 602, the disclosed AI-based software architecture may receive, from a client device 104, a natural-language query (i) that was input by a user and (ii) that is related to a construction project managed via a construction management software platform. In line with the previous discussion with respect to the example AI-based software architecture 300, the input that is received and natural-language query may take various forms, and the user input may be initiated at any of various times.

At block 604, in an optional step, the disclosed AI-based software architecture may determine whether the natural-language query relates to structured data. In line with the previous discussion with respect to the example AI-based software architecture 300, determining whether the natural-language query relates to structured data may comprise (i) generating a prompt for an AI model comprising a request to determine whether the natural-language query relates to structured data, (ii) passing the prompt as input to the AI model, and (iii) receiving a response from the AI model comprising a prediction of whether the natural-language query relates to structured data.

At block 606, the disclosed AI-based software architecture may generate a prompt for a generative AI model that comprises a request to transform the natural-language query into a structured query of a relational data store that is related to the construction project. In line with the previous discussion with respect to the example AI-based software architecture 300, the prompt may further include configuration data related to the relational data store (e.g., one or both of database-schema data or database metadata).

At block 608, the disclosed AI-based software architecture may pass the prompt to the generative AI model and, at block 610, the disclosed AI-based software architecture may receive, from the generative AI model, a response that comprises the structured query that is generated by the generative AI model. In line with the previous discussion with respect to the example AI-based software architecture, functions of passing the generated prompt to the generative AI model and receiving the response from the generative AI model may take any of various forms (which may depend in part on where the generative AI model is hosted).

At block 612, the disclosed AI-based software architecture may perform a search in accordance with the structured query and thereby return search results comprising a dataset that is returned based on the structured query.

At block 614, the disclosed AI-based software architecture may, based on the search results, generate a response to the natural-language query. In line with the previous discussion with respect to the example AI-based software architecture, the response may comprise a natural-language response.

At block 616, the disclosed AI-based software architecture may present, using the client device 104, the response to the user.

Figure 7:
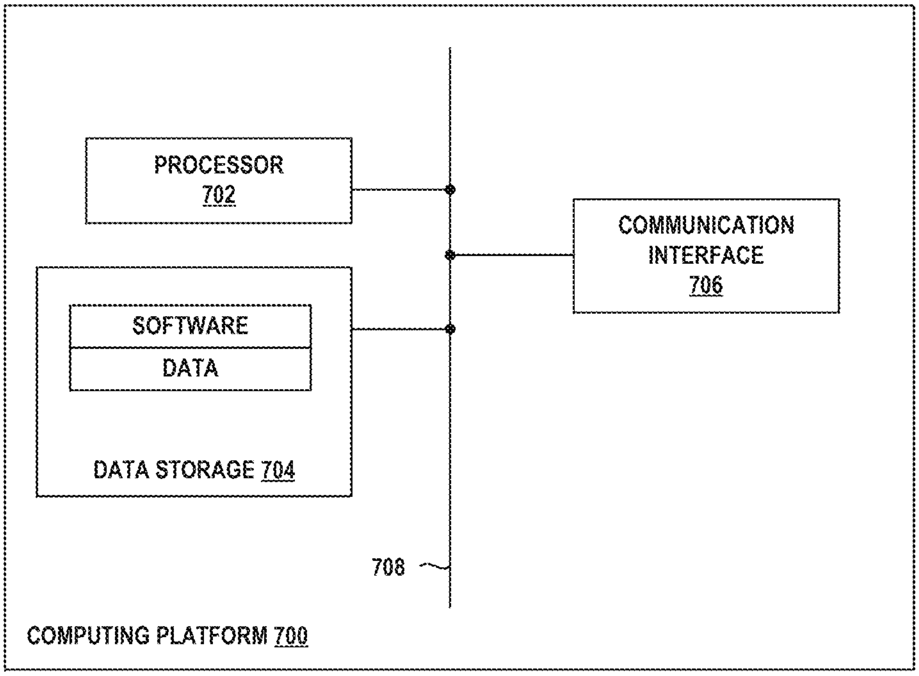
FIG. 7 is a simplified block diagram that illustrates some structural components that may be included in an example computing platform, according to the present disclosure.

Turning now to FIG. 7, a simplified block diagram is provided to illustrate some structural components that may be included in an example computing platform 700 that may be configured to perform the platform-side functions disclosed herein. At a high level, the example computing platform 700 may generally comprise any one or more computer systems (e.g., one or more servers) that collectively include one or more processors 702, data storage 704, and one or more communication interfaces 706, each of which may be communicatively linked by a communication link 708 that may take the form of a system bus, a communication network such as a public, private, or hybrid cloud, or some other connection mechanism. Each of these components may take various forms.

For instance, the one or more processors 702 may comprise one or more processor components, such as one or more central processing units (CPUs), graphics processing units (GPUs), application-specific integrated circuits (ASICs), digital signal processor (DSPs), and/or programmable logic devices such as field programmable gate arrays (FPGAs), among other possible types of processing components. In line with the discussion above, it should also be understood that the one or more processors 702 could comprise processing components that are distributed across a plurality of physical computing devices connected via a network, such as a computing cluster of a public, private, or hybrid cloud.

In turn, the data storage 704 may comprise one or more non-transitory computer-readable storage mediums, examples of which may include volatile storage mediums such as random-access memory, registers, cache, etc. and non-volatile storage mediums such as read-only memory, a hard-disk drive, a solid-state drive, flash memory, an optical-storage device, etc. In line with the discussion above, it should also be understood that the data storage 704 may comprise computer-readable storage mediums that are distributed across a plurality of physical computing devices connected via a network, such as a storage cluster of a public, private, or hybrid cloud that operates according to technologies such as AWS for Elastic Compute Cloud, Simple Storage Service, etc.

As shown in FIG. 7, the data storage 704 may be capable of storing both (i) program instructions that are executable by the one or more processors 702 such that the example computing platform 700 is configured to perform any of the various functions disclosed herein (including but not limited to any of the server-side functions discussed above), and (ii) data that may be received, derived, or otherwise stored by the example computing platform 700.

The one or more communication interfaces 706 may comprise one or more interfaces that facilitate communication between the example computing platform 700 and other systems or devices, where each such interface may be wired and/or wireless and may communicate according to any of various communication protocols. As examples, the one or more communication interfaces 706 may take include an Ethernet interface, a serial bus interface (e.g., Firewire, USB (Universal Serial Bus) 3.0, etc.), a chipset and antenna adapted to facilitate any of various types of wireless communication (e.g., Wi-Fi communication, cellular communication, Bluetooth® communication, etc.), and/or any other interface that provides for wireless or wired communication. Other configurations are possible as well.

Although not shown, the example computing platform 700 may additionally have an Input/Output (I/O) interface that includes or provides connectivity to I/O components that facilitate user interaction with the example computing platform 700, such as a keyboard, a mouse, a trackpad, a display screen, a touch-sensitive interface, a stylus, a virtual-reality headset, and/or one or more speaker components, among other possibilities.

It should be understood that the example computing platform 700 is one example of a computing platform that may be used with the examples described herein. Numerous other arrangements are possible and contemplated herein. For instance, in other examples, the example computing platform 700 may include additional components not pictured and/or more or less of the pictured components.

Figure 8:
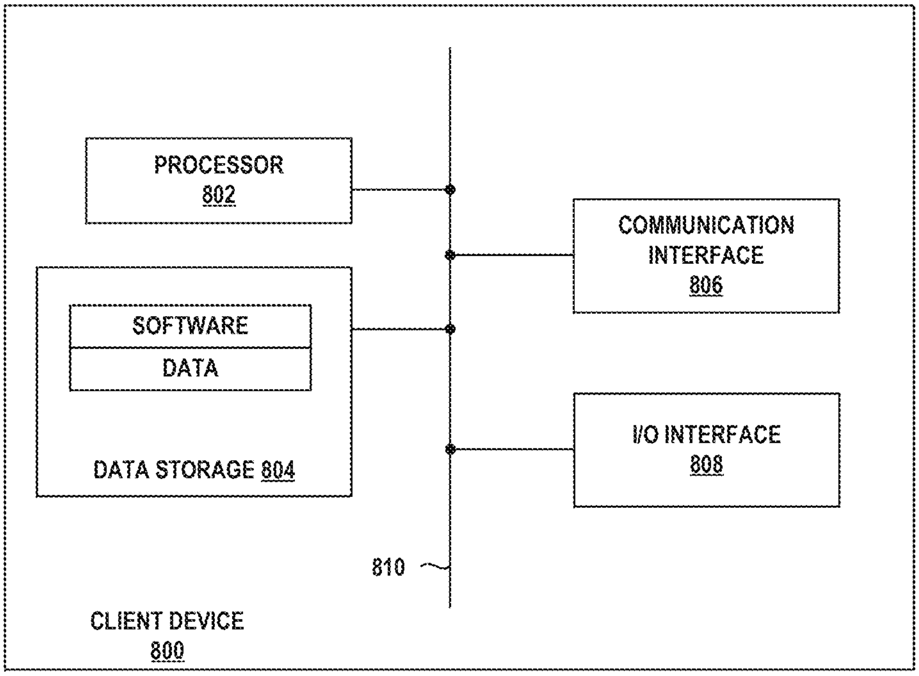
FIG. 8 is a simplified block diagram that illustrates some structural components that may be included in an example client device, according to the present disclosure.

Turning next to FIG. 8, a simplified block diagram is provided to illustrate some structural components that may be included in an example client device 800 that may be configured to perform some the client-side functions disclosed herein. At a high level, the example client device 800 may include one or more processors 802, data storage 804, one or more communication interfaces 806, and an I/O interface 808, each of which may be communicatively linked by a communication link 810 that may take the form a system bus and/or some other connection mechanism. Each of these components may take various forms.

For instance, the one or more processors 802 of the example client device 800 may comprise one or more processor components, such as one or more CPUs, GPUs, NPUs, ASICs, DSPs, and/or programmable logic devices such as FPGAs, among other possible types of processing components.

In turn, the data storage 804 of the example client device 800 may comprise one or more non-transitory computer-readable mediums, examples of which may include volatile storage mediums such as random-access memory, registers, cache, etc. and non-volatile storage mediums such as read-only memory, a hard-disk drive, a solid-state drive, flash memory, an optical-storage device, etc. As shown in FIG. 8, the data storage 804 may be capable of storing both (i) program instructions that are executable by the one or more processors 802 of the example client device 800 such that the example client device 800 is configured to perform any of the various functions disclosed herein (including but not limited to any of the client-side functions discussed above), and (ii) data that may be received, derived, or otherwise stored by the example client device 800.

The one or more communication interfaces 806 may comprise one or more interfaces that facilitate communication between the example client device 800 and other systems or devices, where each such interface may be wired and/or wireless and may communicate according to any of various communication protocols. As examples, the one or more communication interfaces 806 may take include an Ethernet interface, a serial bus interface (e.g., Firewire, USB 3.0, etc.), a chipset and antenna adapted to facilitate any of various types of wireless communication (e.g., Wi-Fi communication, cellular communication, Bluetooth® communication, etc.), and/or any other interface that provides for wireless or wired communication. Other configurations are possible as well.

The I/O interface 808 may generally take the form of (i) one or more input interfaces that are configured to receive and/or capture information at the example client device 800 and (ii) one or more output interfaces that are configured to output information from the example client device 800 (e.g., for presentation to a given user). In this respect, the one or more input interfaces of I/O interface may include or provide connectivity to input components such as a microphone, a camera, a keyboard, a mouse, a trackpad, a touchscreen, an accelerometer, a gyroscope, a location signal receiver (e.g., a cellular signal receiver, a Wi-Fi Positioning System (WPS) receiver, a Bluetooth receiver, a Radio Frequency Identification (RFID) receiver, an Ultra-Wideband (UWB) receiver, a magnetic field receiver, a satellite signal receiver such as a GPS, etc.), and/or a stylus, among other possibilities, and the one or more output interfaces of the I/O interface 808 may include or provide connectivity to output components such as a display screen and/or an audio speaker, among other possibilities.

It should be understood that the example client device 800 is one example of a client device that may be used with the examples described herein. Numerous other arrangements are possible and contemplated herein. For instance, in other examples, the example client device 800 may include additional components not pictured and/or more or fewer of the pictured components.

Examples of the disclosed innovations have been described above. Those skilled in the art will understand, however, that changes and modifications may be made to the examples described without departing from the true scope and spirit of the present invention, which will be defined by the claims.

Further, to the extent that examples described herein involve operations performed or initiated by actors, such as "humans," "operators," "users," or other entities, this is for purposes of example and explanation only. The claims should not be construed as requiring action by such actors unless explicitly recited in the claim language.

The invention claimed is:

1. A computing platform comprising:

at least one non-transitory computer-readable medium;

at least one processor; and program instructions stored on the at least one non-transitory computer-readable medium that, when executed by the at least one processor, cause the computing platform to:

receive, from a client device, a natural-language query (i) that was input by a user and (ii) that is related to a construction project managed via a construction management software platform;

based on configuration data for a software service that is configured to search a relational data store associated with the construction management software platform, generate a prompt for a generative artificial intelligence (AI) model that comprises a request to transform the natural-language query into a structured query for calling an application program interface (API) of the software service;

pass the prompt to the generative AI model;

receive, from the generative AI model, a response that comprises the structured query that is generated by the generative AI model;

utilize the structured query to call the API of the software service and thereby cause the software service to (i) perform a search in accordance with the structured query and (ii) return search results comprising a dataset that is returned based on the structured query;

based on the search results, generate a response to the natural-language query; and present, via the client device, the response to the user.

2. The computing platform of claim 1, further comprising program instructions stored on the at least one non-transitory computer-readable medium that, when executed by the at least one processor, cause the computing platform to:

determine whether the natural-language query relates to structured data; and wherein the program instructions that, when executed by the at least one processor, cause the computing platform to generate the prompt for the generative AI model that comprises the request to transform the natural-language query into the structured query for calling the API of the software service comprise program instructions that, when executed by the at least one processor, cause the computing platform to:

if the natural-language query relates to structured data, generate the prompt for the generative AI model that comprises the request to transform the natural-language query into the structured query for calling the API of the software service.

3. The computing platform of claim 2, wherein the prompt for the generative AI model comprises a first prompt for a first generative AI model, and wherein the program instructions that, when executed by the at least one processor, cause the computing platform to determine whether the natural-language query relates to structured data comprise program instructions that, when executed by the at least one processor, cause the computing platform to:

generate a second prompt for a second generative AI model comprising a request to determine whether the natural-language query relates to structured data;

pass the second prompt as input to the second generative AI model; and receive a response from the second generative AI model comprising a prediction of whether the natural-language query relates to structured data.

4. The computing platform of claim 1, wherein the program instructions that, when executed by the at least one processor, cause the computing platform to generate the prompt for the generative AI model that comprises the request to transform the natural-language query into the structured query for the API of the software service comprise program instructions that, when executed by the at least one processor, cause the computing platform to:

use a first AI agent to generate the prompt for the generative AI model that comprises the request to transform the natural-language query into the structured query for calling the API of the software service, and the computing platform further comprising program instructions stored on the at least one non-transitory computer-readable medium that, when executed by the at least one processor, cause the computing platform to:

if the natural-language query relates to structured data, route the natural-language query to the first AI agent; and if the natural-language query does not relate to structured data, route the natural-language query to a second AI agent.

5. The computing platform of claim 1, further comprising program instructions stored on the at least one non-transitory computer-readable medium that, when executed by the at least one processor, cause the computing platform to:

based on the search results, generate a report related to the natural-language query; and present, via the client device, the report to the user.

6. The computing platform of claim 1, wherein the prompt further comprises at least a portion of the configuration data.

7. The computing platform of claim 1, wherein the configuration data comprises one or both of a schema or database metadata.

8. The computing platform of claim 1, further comprising program instructions stored on the at least one non-transitory computer-readable medium that, when executed by the at least one processor, cause the computing platform to:
obtain the configuration data by calling the API of the software service.

9. The computing platform of claim 1, wherein the software service comprises a reporting tool of the construction management software platform.

10. A non-transitory computer-readable medium having stored thereon program instructions that, when executed by at least one processor, cause a computing platform to:
receive, from a client device, a natural-language query (i) that was input by a user and (ii) that is related to a construction project managed via a construction management software platform;
based on configuration data for a software service that is configured to search a relational data store associated with the construction management software platform, generate a prompt for a generative artificial intelligence (AI) model that comprises a request to transform the natural-language query into a structured query for calling an application program interface (API) of the software service;
pass the prompt to the generative AI model;
receive, from the generative AI model, a response that comprises the structured query that is generated by the generative AI model;
perform a search in accordance with the structured query and thereby return search results comprising a dataset that is returned based on the structured query;
based on the search results, generate a response to the natural-language query; and
present, via the client device, the response to the user.

11. The non-transitory computer-readable medium of claim 10, wherein the non-transitory computer-readable medium also has stored thereon program instructions that, when executed by at least one processor, cause the computing platform to:
determine whether the natural-language query relates to structured data; and
wherein the program instructions that, when executed by the at least one processor, cause the computing platform to generate the prompt for the generative AI model that comprises the request to transform the natural-language query into the structured query for calling the API of the software service comprise program instructions that, when executed by the at least one processor, cause the computing platform to:
if the natural-language query relates to structured data, cause the computing platform to generate the prompt for the generative AI model that comprises the request to transform the natural-language query into the structured query for calling the API of the software service.

12. The non-transitory computer-readable medium of claim 11, wherein the prompt for the generative AI model comprises a first prompt for a first generative AI model, and wherein the program instructions that, when executed by at least one processor, cause the computing platform to determine whether the natural-language query relates to structured data comprise program instructions that, when executed by the at least one processor, cause the computing platform to:
generate a second prompt for a second generative AI model comprising a request to determine whether the natural-language query relates to structured data;
pass the second prompt as input to the second generative AI model; and
receive a response from the second generative AI model comprising a prediction of whether the natural-language query relates to structured data.

13. The non-transitory computer-readable medium of claim 11, wherein the program instructions that, when executed by the at least one processor, cause the computing platform to generate the prompt for the generative AI model that comprises the request to transform the natural-language query into the structured query for calling the API of the software service comprise program instructions that, when executed by the at least one processor, cause the computing platform to:
use a first AI agent to generate the prompt for the generative AI model that comprises the request to transform the natural-language query into the structured query for calling the API of the software service, and
the non-transitory computer-readable medium also having stored thereon program instructions that, when executed by the at least one processor, cause the computing platform to:
if the natural-language query relates to structured data, route the natural-language query to the first AI agent; and
if the natural-language query does not relate to structured data, route the natural-language query to a second AI agent.

14. The non-transitory computer-readable medium of claim 10, also having stored thereon program instructions that, when executed by the at least one processor, cause the computing platform to:
based on the search results, generate a report related to the natural-language query; and
present, via the client device, the report to the user.

15. The non-transitory computer-readable medium of claim 10, wherein the prompt further comprises at least a portion of the configuration data.

16. The non-transitory computer-readable medium of claim 10, wherein the configuration data comprises one or both of a schema or database metadata.

17. A method carried out by a computing platform, the method comprising:
receiving, from a client device, a natural-language query (i) that was input by a user and (ii) that is related to a construction project managed via a construction management software platform;
based on configuration data for a software service that is configured to search a relational data store associated with the construction management software platform, generating a prompt for a generative artificial intelligence (AI) model that comprises a request to transform the natural-language query into a structured query for calling an application program interface (API) of the software service;
passing the prompt to the generative AI model;
receiving, from the generative AI model, a response that comprises the structured query that is generated by the generative AI model;
utilizing the structured query to call the API of the software service and thereby cause the software service to (i) perform a search in accordance with the structured query and thereby return search results comprising a dataset that is returned based on the structured query;

based on the search results, generating a response to the natural-language query; and presenting, via the client device, the response to the user.

18. The method of claim 17, further comprising:

determining whether the natural-language query relates to structured data; and wherein generating the prompt for the generative AI model that comprises the request to transform the natural-language query into the structured query for calling the API of the software service comprises:

if the natural-language query relates to structured data, causing the computing platform to generate the prompt for the generative AI model that comprises the request to transform the natural-language query into the structured query for calling the API of the software service.

19. The method of claim 18, wherein the prompt for the generative AI model comprises a first prompt for a first generative AI model, and wherein determining whether the natural-language query relates to structured data comprises:

generating a second prompt for a second generative AI model comprising a request to determine whether the natural-language query relates to structured data;

passing the second prompt as input to the second generative AI model; and receiving a response from the second generative AI model comprising a prediction of whether the natural-language query relates to structured data.

20. The method of claim 17, wherein the prompt further comprises at least a portion of the configuration data.

* * * * *